UNITED STATES PATENT OFFICE.

GARDNER CORNING, OF NEW YORK, N. Y., ASSIGNOR TO THE BRIQUETTE COAL COMPANY, OF SAME PLACE.

METHOD OF MANUFACTURING ARTIFICIAL FUEL.

SPECIFICATION forming part of Letters Patent No. 613,497, dated November 1, 1898.

Application filed May 17, 1898. Serial No. 680,939. (No specimens.)

*To all whom it may concern:*

Be it known that I, GARDNER CORNING, of New York, county of New York, State of New York, have invented a new and useful Method of Manufacturing Artificial Fuel, of which the following is a specification.

My invention relates to improvements in artificial fuel, its object being to devise a method for the efficient utilization of the waste products of coal mines and yards in the form of dust or culm; and it consists in the new and improved steps of the process of manufacturing the same into blocks or briquets, hereinafter set forth and claimed.

In the working of the process the binding ingredients employed for uniting the coal-dust into briquets are suitable bitumens and quick or fresh-burned lime. Of the bitumens natural asphaltum is preferred, although the artificial bitumens, such as the by or residual products of petroleum, are suitable. The crude natural asphaltum, however, is too brittle for the purpose and requires tempering by the admixture of some artificial bitumen, especially a residuum oil of petroleum, to impart elasticity and tenacity. To properly combine the coal-dust and bitumen, both are heated to as high temperature as practicable without injury by burning or cooking. By thorough intermixture while thus heated the thinnest possible film or coating of bitumen is given to the dust particles to secure their firm adhesion when cooled. The preferable temperatures employed with natural asphaltum I have found to be about 300° Fahrenheit for the dust and 320° to 340° for the asphaltum. If other bitumens are used, the temperatures may be varied to adapt them to the different melting-points of the bitumens. To secure the most efficient binding action of the lime, it is slaked with sufficient water to make a liquid mass of about the consistency of cream and which is therefore known as "cream of lime." This is intermixed with the combined dust and bitumen while their mass is still hot, and this step of the process is the most essential part of the method.

The proportions of the ingredients are: coal-dust, about eighteen hundred and seventy pounds; bitumen, about eighty pounds, and lime about fifty pounds.

Where natural asphaltum is employed, about five pounds of the artificial or tempering agent is mixed with about seventy-five pounds of the asphaltum.

Either anthracite, bituminous, or lignite coal dust may be worked by this process; but I have secured the best results by combining bituminous dust with the other.

The process in detail is as follows: The coal-dust is heated to the requisite temperature, the asphaltum melted and the tempering-oil mixed with it, and the mixture heated to the requisite degree. These are then thoroughly combined in a mixer, which requires usually about three minutes. The cream of lime is then added to the hot mass, the mixing operation being continued until the water begins to vaporize. The mass is then delivered to a press while still hot and moist and formed as quickly as possible into briquets under heavy pressure.

I claim—

1. The herein-described process of making artificial fuel in blocks, which consists in heating coal-dust and bitumen to a high temperature and thoroughly intermixing them, then adding cream of lime to the highly-heated intermixture and quickly stirring the same into the mass until vaporization of the water of the cream of lime commences, and then quickly compressing the mass into blocks.

2. The method of manufacturing artificial fuel in blocks, which consists in separately heating coal-dust, asphaltum, and a tempering agent of the asphaltum to high temperature, then thoroughly mixing the same while at such temperature, then adding thereto cream of lime and continuing the mixing until the vaporization of the water in the cream of lime commences, and then molding the mass into blocks.

3. The herein-described process of manufacturing artificial fuel in blocks, consisting in adding to asphaltum a petroleum by-product, heating both to about 320° to 340° Fahrenheit, heating coal-dust to about 300° Fahrenheit, mixing all thoroughly together while thus heated, adding cream of lime and continuing the mixing operation until the water in the cream of lime begins to be vaporized, and then quickly molding the mass under great pressure into blocks.

Signed at New York city this 14th day of May, 1898.

GARDNER CORNING.

Witnesses:
AUGUSTUS LEE, Jr.,
T. D. MERWIN.